(12) United States Patent
Klassen et al.

(10) Patent No.: US 8,688,081 B2
(45) Date of Patent: *Apr. 1, 2014

(54) AUTOMATIC USER AVAILABILITY STATUS DETERMINATION FOR A HANDHELD COMMUNICATION DEVICE

(75) Inventors: Gerhard D. Klassen, Waterloo (CA); Shaul S. Wisebourt, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/280,504

(22) Filed: Oct. 25, 2011

(65) Prior Publication Data

US 2012/0094640 A1   Apr. 19, 2012

Related U.S. Application Data

(63) Continuation of application No. 11/048,716, filed on Feb. 3, 2005, now Pat. No. 8,064,355.

(60) Provisional application No. 60/607,758, filed on Sep. 8, 2004.

(51) Int. Cl.
*H04L 12/58*  (2006.01)
*H04M 1/725*  (2006.01)

(52) U.S. Cl.
USPC ............. 455/412.1; 455/550.1; 455/418; 455/414.1; 709/204

(58) Field of Classification Search
USPC ................. 455/412.1, 412.2, 550.1
See application file for complete search history.

(56) References Cited

U.S. PATENT DOCUMENTS

| 6,438,392 B1 | 8/2002 | Toba |
| 6,493,759 B1 | 12/2002 | Passman et al. |
| 6,519,639 B1 | 2/2003 | Glasser et al. |
| 6,658,095 B1 | 12/2003 | Yoakum et al. |

(Continued)

FOREIGN PATENT DOCUMENTS

| WO | 2003098449 | 11/2003 |
| WO | 2005027369 | 3/2005 |
| WO | 2005027429 | 3/2005 |

OTHER PUBLICATIONS

European Patent Office, European Search Report, Feb. 26, 2008, EP 05706450.3.

(Continued)

*Primary Examiner* — Vladimir Magloire
(74) *Attorney, Agent, or Firm* — Borden Ladner Gervais LLP; Neil Henderson

(57) ABSTRACT

To automatically determine the availability status of the user of a handheld communication device, various conditions of the device may be checked, which imply whether the user is likely Available, or Unavailable or the equivalent. Normally, the conditions are checked only if the user has not explicitly or semi-explicitly set his or her status to Unavailable. The conditions to be checked can vary, but generally include anything from which it might be inferred or implied that the user is likely Available or Unavailable or the equivalent. Such conditions can include, for example, whether or not a specified timeout for use of a mechanical feature has elapsed; whether a real-time application is in use; and preferably any one or more of other conditions, one further example being whether there are any unattended-to notifications such as an unanswered phone call, or a missed e-mail, or other message.

12 Claims, 3 Drawing Sheets

(56) References Cited

U.S. PATENT DOCUMENTS

| | | | |
|---|---|---|---|
| 6,674,358 | B1 | 1/2004 | Tinsley |
| 6,714,519 | B2 | 3/2004 | Luzzatti et al. |
| 7,062,026 | B1 | 6/2006 | Okano |
| 7,076,267 | B2 | 7/2006 | Vander Veen |
| 7,120,239 | B2 | 10/2006 | Contractor |
| 7,139,797 | B1 | 11/2006 | Yoakum et al. |
| 7,139,806 | B2 | 11/2006 | Hayes et al. |
| 7,227,937 | B1 | 6/2007 | Yoakum et al. |
| 7,283,805 | B2 | 10/2007 | Agrawal |
| 2002/0054117 | A1 | 5/2002 | Van Dantzich et al. |
| 2002/0083127 | A1* | 6/2002 | Agrawal ................. 709/203 |
| 2002/0087649 | A1 | 7/2002 | Horvitz et al. |
| 2002/0143916 | A1 | 10/2002 | Mendiola et al. |
| 2002/0162112 | A1 | 10/2002 | Javed |
| 2003/0018726 | A1 | 1/2003 | Low et al. |
| 2003/0104819 | A1 | 6/2003 | Knauerhase et al. |
| 2003/0135624 | A1 | 7/2003 | McKinnon et al. |
| 2004/0039630 | A1* | 2/2004 | Begole et al. ................. 705/11 |
| 2004/0162882 | A1 | 8/2004 | Mora |
| 2004/0199663 | A1* | 10/2004 | Horvitz et al. ................. 709/238 |
| 2005/0058094 | A1 | 3/2005 | Lazaridis et al. |
| 2005/0108348 | A1 | 5/2005 | Lee |
| 2005/0108392 | A1 | 5/2005 | Glasser et al. |
| 2005/0124363 | A1 | 6/2005 | Klassen et al. |
| 2005/0148331 | A1 | 7/2005 | Sharon et al. |
| 2005/0273827 | A1 | 12/2005 | Javed et al. |
| 2006/0031368 | A1 | 2/2006 | DeCone |
| 2006/0135182 | A1 | 6/2006 | Unmehopa |
| 2006/0187847 | A1 | 8/2006 | Pelton et al. |
| 2008/0089488 | A1 | 4/2008 | Brunson et al. |

OTHER PUBLICATIONS

Canadian Intellectual Property Office, Office Action, Mar. 16, 2009, CA 2580711.
European Patent Office, Summons to Attend Oral Proceedings, Aug. 6, 2009, EP 05706450.3.
Canadian Intellectual Property Office, Office Action, Jan. 21, 2010, CA 2580711.
European Patent Office, European Search Report, Apr. 8, 2010, EP 09174231.7.
United States Patent and Trademark Office, Non-Final Office Action, Jun. 23, 2010, U.S. Appl. No. 11/048,716.
United States Patent and Trademark Office, Final Office Action, Dec. 16, 2010, U.S. Appl. No. 11/048,716.
Canadian Intellectual Property Office, Office Action, Dec. 23, 2010, CA 2580711.
United States Patent and Trademark Office, Non-Final Office Action, Feb. 23, 2011, U.S. Appl. No. 12/354,184.
United States Patent and Trademark Office, Notice of Allowance, Jul. 22, 2011, U.S. Appl. No. 11/048,716.
United States Patent and Trademark Office, Final Office Action, Aug. 5, 2011, U.S. Appl. No. 12/354,184.
European Patent Office, European Examination Report, Jul. 3, 2012, EP 09179231.7.
United States Patent and Trademark Office, Office Action for U.S. Appl. No. 12/354,184, Oct. 2, 2012.
United States Patent and Trademark Office, Office Action for U.S. Appl. No. 12/354,184, Feb. 11, 2013.
United States Patent and Trademark Office, Final Office Action for U.S. Appl. No. 12/354,184, Jun. 10, 2013.

* cited by examiner

AUTOMATIC USER AVAILABILITY STATUS DETERMINATION FOR A HANDHELD COMMUNICATION DEVICE

REFERENCE TO RELATED APPLICATION

This is a continuation of U.S. patent application Ser. No. 11/048,716, filed Feb. 3, 2005, which claims the benefit of Provisional Application No. 60/607,758, filed Sep. 8, 2004, the contents of all of which are expressly incorporated herein by reference.

BACKGROUND

This application relates to handheld communication devices, and in particular to a method for automatically determining the availability status of a user of a handheld communication device.

There are handheld communication device applications in which updated user availability status information is important. Instant messaging is a good example of such an application. A user expects answers mostly in real time (unlike SMS, for example), so it is critical to know other party's availability status at the time when the user sends his or her instant message. Most instant messaging allow the user to explicitly set his or her availability status. Most such applications also provide an implicit way for the client application to say whether the user is available or not. Usually the user availability status is changed by a desktop application based on whether the keyboard has remained idle for a certain period of time. However, this approach is not relevant for some handheld communication devices, such as when the device is in its holster, for example. The user may be actually available for responses, and just in a waiting mode, with the device idle. The implicit or automatic approach that is used by a desktop client is therefore not applicable to such devices.

SUMMARY

In view of the above, it is an object of the embodiments herein to provide an improved method for determining the availability status of a user of a handheld communication device.

Thus according to an aspect herein, a method is provided for automatically determining user availability status. Various selected conditions of the device may be checked, which imply whether or not the user is likely Available, or else Unavailable.

According to a further aspect herein, preferably the selected conditions are checked only if the user has not explicitly or semi-explicitly set his or her status to Unavailable. In such a case, checking would be clearly redundant, since the user has clearly indicated a desire to override any automatic determination.

The conditions to be checked can vary widely, but generally include anything from which it might be inferred or implied that the user is likely either Available or Unavailable. Such conditions can include, for example, whether or not a specified timeout for use of a keypad, trackwheel or other mechanical feature of the device has elapsed yet; whether or not a real-time application is in use (a phone or games application, for example); and preferably any one or more of a variety of other conditions, one further example being whether or not there are any unattended-to notifications such as an unanswered phone call, or a missed e-mail, SMS or other message.

Further aspects herein will be described or will become apparent in the course of the following detailed description.

Throughout this specification, the terms Available and Unavailable are used for convenience. Of course it should be clearly understood that the terms used may vary among devices and from company to company within the industry, and the invention applies regardless of what actual terms are used to describe the states herein designated as Available and Unavailable. Without limiting the generality of the foregoing, alternative expressions such as "busy" or "unreachable" or "inaccessible" could be used, for example.

BRIEF DESCRIPTION OF THE DRAWINGS

Aspects herein will now be described with reference to the accompanying drawings, in which.

DETAILED DESCRIPTION

Figure 1:
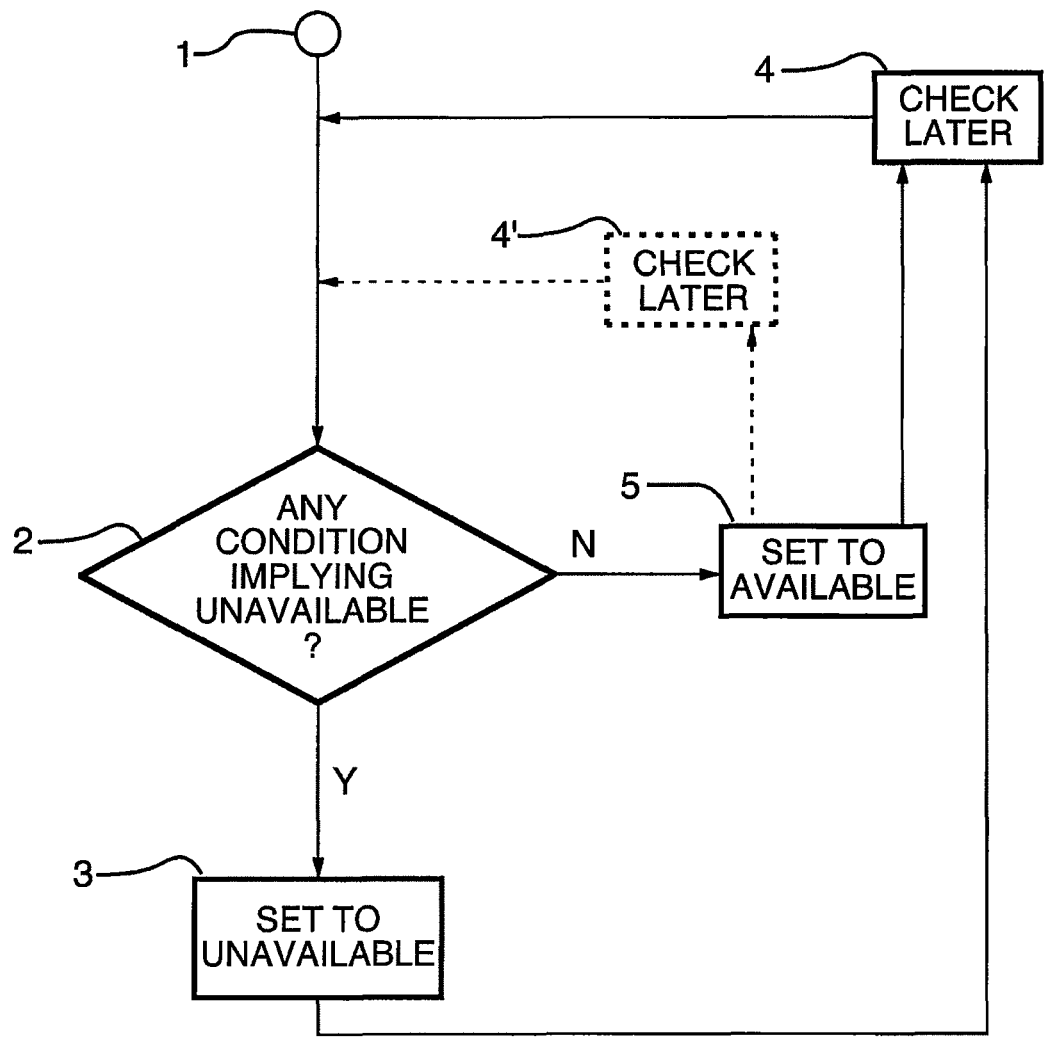
FIG. 1 is a block diagram showing an example of the invention.

FIG. 1 shows the principle embodiment. From an entry point 1, the method checks at box 2 for any one or more of a number of possible conditions which might reasonably imply that the user is Unavailable. If one of those conditions applies, then the user availability status is set to Unavailable at box 3 and there is a Check Later at box 4 to see if that is still the case. Otherwise, the user availability status is set to Available at box 5, and there is a check again later at box 4, or instead via box 4' if a different time interval was desired than the time interval of box 4.

In the FIG. 1 example, the method is invoked only if the user has not explicitly set his or her status to Unavailable (via a Do Not Disturb option or setting or button, for example). Similarly, if the user has "semi-explicitly" set his or her status to Unavailable, for example by selecting a "Quiet" or other profile which implies Unavailable or which has Unavailable associated with it by default or by user selection, then the method is not invoked, i.e. there is no path to entry point 1. The check for this explicit or semi-explicit setting takes place outside the example.

Figure 2:
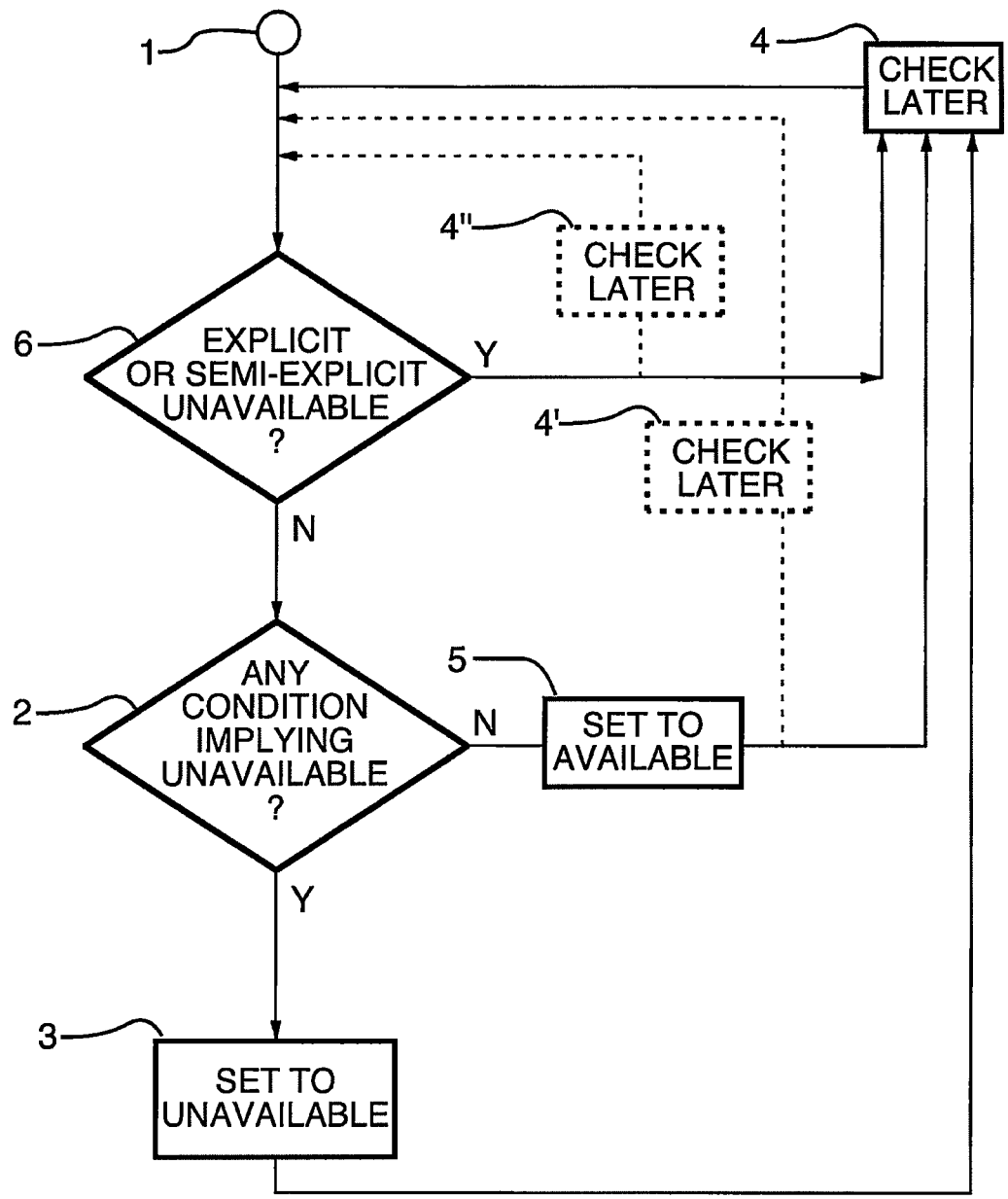
FIG. 2 is a block diagram showing an alternative example of the invention.

In FIG. 2, an alternative is shown, in which checking for an explicit or semi-explicit Unavailable setting takes place within the example. From the entry point 1, that is the first condition which is checked, at box 6. If there is an explicit or semi-explicit Unavailable setting, then there is just a Check Later at box 4 or box 4", to see if that is still the case. Otherwise, the rest of the method proceeds as in FIG. 1.

Figure 3:
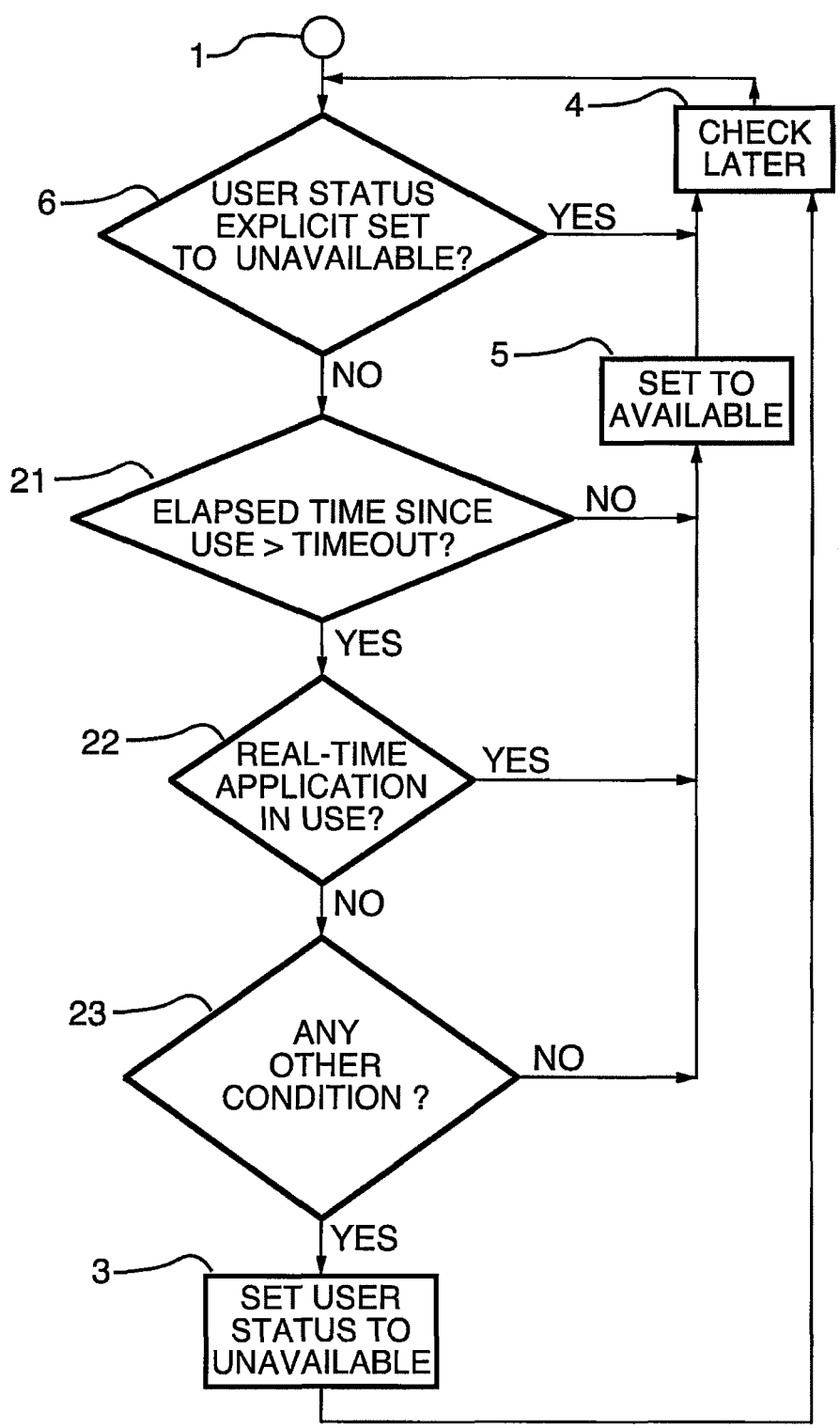
FIG. 3 is a block diagram showing a more specific example of the invention.

FIG. 3 shows a particular example of the invention. This example follows the model of FIG. 2, but could also follow the model of FIG. 1, i.e. with respect to whether or not the check for explicit or semi-explicit Unavailable status takes place within the method or elsewhere. In FIG. 3, boxes 21, 22 and 23 correspond to box 2 in FIGS. 1 and 2, and provide specific examples of conditions which could be checked in making an automatic user status determination.

Preferably the method first checks at box 21 to see if the elapsed time from last use of a keyboard or trackwheel or possibly some other mechanical feature of the device is greater than some defined timeout, 15 to 30 minutes for example. If not, then the user availability status is set to or left at Available, i.e. he or she is considered to be Available in view of current or recent use of the device.

If the timeout has elapsed, then preferably the method next checks at box 22 to see if a real-time application such as a phone or game is in use. If so, the user availability status is set to or left at Available, i.e. he or she is considered to be likely Available, just temporarily occupied.

If there is no real-time application in use, then preferably the method next checks at box 23 for any one of a number of possible additional conditions which might indicate or imply that the user is Unavailable. For example, the method could check for any of the following:

a. Unattended-to notifications: if there are notifications, for example an unanswered phone call, or a missed e-mail, SMS or other message, which the user has not responded to;

b. A Calendar event, indicating a contemporaneous appointment;

c. An event which the device recognizes as the user indicating temporary unavailability. For example, in some devices, the action of removing the device from a holster and immediately replacing it ("click-click") may be deemed to be a signal that the user doesn't want to accept any notifications;

d. The device being locked;

e. The time being within the user's indicated normal sleep or off-duty hours;

f. The battery being low, in which case the user may wish to be considered Unavailable, to preserve the battery for other uses;

g. The user being out of the coverage area; and h. Anything else relevant to the particular device, that might logically indicate Unavailable.

It should be clearly understood that the above is a list of examples only, and the manner in which the method is applied may vary considerably. For some devices, some of the above options may not be applicable, or there may be some options available which are not listed. And for some devices, even if the options are available, a decision may be made that only one or a few options will be checked. For example, it may be decided just to check whether the timeout has elapsed, if so check whether a real-time application is in use, and if not check for any unattended-to notifications.

If one of the conditions checked for does indeed apply, then the user availability status is set to Unavailable at box 3. Otherwise, it is set to Available at box 5. In either event, the method then routes to the Check Later box 4.

Especially if it is decided that the system will be set up to check a number of conditions, it makes sense to first check if a real-time application is in use, as in the preceding. However, that is not strictly a requirement of the invention. It is merely preferable, before using resources to check for other conditions. In general, it makes sense, where there are multiple conditions to be checked, to check them in the order of highest probability, though not mandatory.

The consequences of the device being deemed Available or Unavailable depend on specific applications and specific implementations, and can vary. That is outside the scope of the invention itself. The consequences can be established by either the user's device, or a peer device, or both of them. For example, the user might not be able to send a message to someone who is Unavailable, or, as another example, the user may still be able to send the message, but the peer device will not notify the user if the peer device is Unavailable. The behavior may be fixed, or preferably can be defined through user options.

Those who are knowledgeable in the field of the invention will appreciate that there may be obvious variations to the preceding. Accordingly, the invention is defined not by the above specific examples, but by the claims which follow.

The invention claimed is:

1. A method for determining the availability status of a user of a handheld communication device, the method comprising, at the handheld communication device:

periodically checking whether or not there are any implicit unattended-to notifications at the handheld communication device, the unattended-to notifications comprising at least one of an unattended-to message and an unattended-to phone call, and if so, deeming the availability status to be Unavailable, but otherwise deeming the user availability status to be Available.

2. A method as in claim 1, further comprising checking whether or not the availability status has been explicitly or semi-explicitly set to Unavailable, and if so, bypassing the checking.

3. A method as in claim 2, wherein, after bypassing, there is no further checking until when and if the availability status is set to Available.

4. A method as in claim 2, wherein after bypassing, there is no further checking until a predetermined time interval has passed.

5. A method as in claim 1, wherein the unattended-to message comprises at least one of:

an unattended to e-mail; and an unattended to SMS message.

6. A handheld communication device provided with a physical computer-readable medium containing instructions, which, when executed by the handheld communication device, cause the handheld communication device to perform a method for determining the availability status of a user of the device, the method comprising, at the handheld communication device:

periodically checking whether or not there are any implicit unattended-to notifications at the handheld communication device, the unattended-to notifications comprising at least one of an unattended-to message and an unattended-to phone call, and if so, deeming the availability status to be Unavailable, but otherwise deeming the user availability status to be Available.

7. A handheld communication device as in claim 6, wherein the method further comprises checking whether or not the availability status has been explicitly or semi-explicitly set to Unavailable, and if so, bypassing the checking.

8. A handheld communication device as in claim 7, wherein after bypassing, there is no further checking of availability status until when and if the availability status is set to Available.

9. A handheld communication device as in claim 7, wherein after bypassing, there is no further checking of availability status until a predetermined time interval has passed.

10. A handheld communication device as in claim 6, wherein the unattended-to message comprises at least one of:

an unattended to e-mail; and an unattended to message.

11. A method for determining the availability status of a user of a handheld communication device, the method comprising, at the handheld communication device:

periodically checking whether or not there are any implicit unattended-to notifications at the handheld communication device, the unattended-to notifications comprising at least one of an unattended-to message and an unattended-to phone call, and if so, deeming the availability status to be Unavailable, but otherwise deeming the user availability status to be Available;

periodically checking whether or not a predefined timeout has elapsed from the last use of a mechanical feature of the device by the user, and if the timeout has not elapsed, deeming the availability status to be Available;

if the timeout has elapsed, checking to see if a real-time application is in use, and if so, deeming the availability status to be Available; and if a real time application is not in use, carrying out the checking whether or not there are any unattended-to notifications.

12. A handheld communication device provided with a physical computer-readable medium containing instructions, which, when executed by the handheld communication device, cause the handheld communication device to perform a method for determining the availability status of a user of the device, the method comprising, at the handheld communication device:

periodically checking whether or not there are any implicit unattended-to notifications at the handheld communication device, the unattended-to notifications comprising at least one of an unattended-to message and an unattended-to phone call, and if so, deeming the availability status to be Unavailable, but otherwise deeming the user availability status to be Available;

periodically checking whether or not a predefined timeout has elapsed from the last use of a mechanical feature of the device by the user, and if the timeout has not elapsed, deeming the availability status to be Available;

if the timeout has elapsed, checking to see if a real-time application is in use, and if so, deeming the availability status to be Available; and if a real time application is not in use, carrying out the checking whether or not there are any unattended-to notifications.

* * * * *